United States Patent
Badawy

(10) Patent No.: US 7,612,666 B2
(45) Date of Patent: Nov. 3, 2009

(54) VIDEO BASED MONITORING SYSTEM

(76) Inventor: Wael Badawy, 150 Edgeview Road NW, Calgary, Alberta (CA) T3A 4V1

( * ) Notice: Subject to any disclaimer, the term of this patent is extended or adjusted under 35 U.S.C. 154(b) by 371 days.

(21) Appl. No.: 10/898,952

(22) Filed: Jul. 27, 2004

(65) Prior Publication Data

US 2006/0024020 A1 Feb. 2, 2006

(51) Int. Cl.
G08B 13/00 (2006.01)
G08B 1/08 (2006.01)
H04N 7/18 (2006.01)

(52) U.S. Cl. .................. 340/541; 340/539.25; 348/154

(58) Field of Classification Search ............... 340/541, 340/539.1–539.26, 545.1–567; 348/77, 152–156; 375/240.01–241; 382/103
See application file for complete search history.

(56) References Cited

U.S. PATENT DOCUMENTS

| | | | |
|---|---|---|---|
| 5,602,585 A | | 2/1997 | Dickinson et al. |
| 6,049,281 A | * | 4/2000 | Osterweil ............... 340/573.4 |
| 6,097,429 A | | 8/2000 | Seeley et al. |
| 6,373,389 B1 | | 4/2002 | Przygoda, Jr. et al. |
| 6,611,206 B2 | * | 8/2003 | Eshelman et al. ........ 340/573.1 |
| 6,720,874 B2 | * | 4/2004 | Fufido et al. ............... 340/541 |
| 6,727,818 B1 | * | 4/2004 | Wildman et al. ......... 340/573.1 |
| 6,927,694 B1 | * | 8/2005 | Smith et al. ................. 340/576 |
| 6,958,683 B2 | * | 10/2005 | Mills et al. .................. 340/436 |
| 2002/0044054 A1 | * | 4/2002 | Krubiner et al. ......... 340/545.3 |
| 2003/0010345 A1 | * | 1/2003 | Koblasz et al. ............. 128/845 |
| 2004/0061781 A1 | * | 4/2004 | Fennell et al. .............. 348/169 |

* cited by examiner

*Primary Examiner*—Jennifer Mehmood
(74) *Attorney, Agent, or Firm*—Anthony R. Lambert

(57) ABSTRACT

A video-based monitoring system has a video recording device having a field of view, wherein plural zones are defined within the field of view of the video recording device, each zone having an algorithm corresponding to movement in that zone, and a processing unit for receiving and processing video data from the video recording device.

33 Claims, 4 Drawing Sheets

VIDEO BASED MONITORING SYSTEM

BACKGROUND OF THE INVENTION

Patients and individuals during hospitalization or during a stay in an extended care unit or after an event in their home require lots of attention and care from the nursing staff, hospital personnel, or care givers. Special care is needed for elderly and those suffering from mental disorders or other types of medical disease, which often require 24 hour supervision to prevent accidents. For example, the danger of a person falling from bed while sleeping may result in an accident such as hip fracture, broken bones, sores, etc. In the case of an elderly person, these accidents may prove fatal. The current system only allows for detection of falling and raising an alarm for a potential fall.

In another example, some courses of treatment may require a patient to walk or move periodically for a short period of time. The conventional method to record this movement is to have someone visiting the patient to verify his movement. Alternatively, some treatments required the patient to move a member of their body, such as hand, or leg, etc., periodically for a short period of time. Again, a physician or individual has to accompany the patient to make sure that the patient is moving this member.

SUMMARY OF THE INVENTION

There is therefore provided, according to an aspect of the invention, a video-based monitoring system. The monitoring system comprises a video recording device having a field of view, wherein plural zones are defined within the field of view of the video recording device, each zone being associated with an algorithm for detecting movement in that zone; and a processing unit for receiving and processing video data from the video recording device. The processing unit may further comprise an analysis unit for classifying a movement in a zone based on the algorithm, a control unit for activating a response based on the classification, a detection unit for detecting movement, a video recording unit for recording the event, and/or a storage unit for storing a record the movement for future reference which may be store according to time and classification.

Data may be transmitted over a wireless network. The analysis unit may classify the movement as one of no motion, motion-allowed, motion-required, motion-risky or motion-prohibited. The response activated by the control unit may be a remote monitor, a wireless device, a visual signal, an audio signal, or a dial-up connection. More than one video recording devices may be present, and the control unit or the analysis unit may receive data from plural recording devices.

According to an other aspect of the invention, the video-based monitoring system is used to monitor a hospital room, where the zones may include one or more bed zones, a door zone, an activity zone, and a high risk zone. There is also disclosed a method of monitoring room confined patients. These and other aspects of the invention are referred to in the detailed description and claims that follow.

BRIEF DESCRIPTION OF THE DRAWINGS

There will now be given a detailed description of preferred embodiments of the invention, with reference to the drawings, by way of illustration only and not limiting the scope of the invention, in which like numerals refer to like elements, and in which.

DETAILED DESCRIPTION OF A PREFERRED EMBODIMENT

Figure 1A:
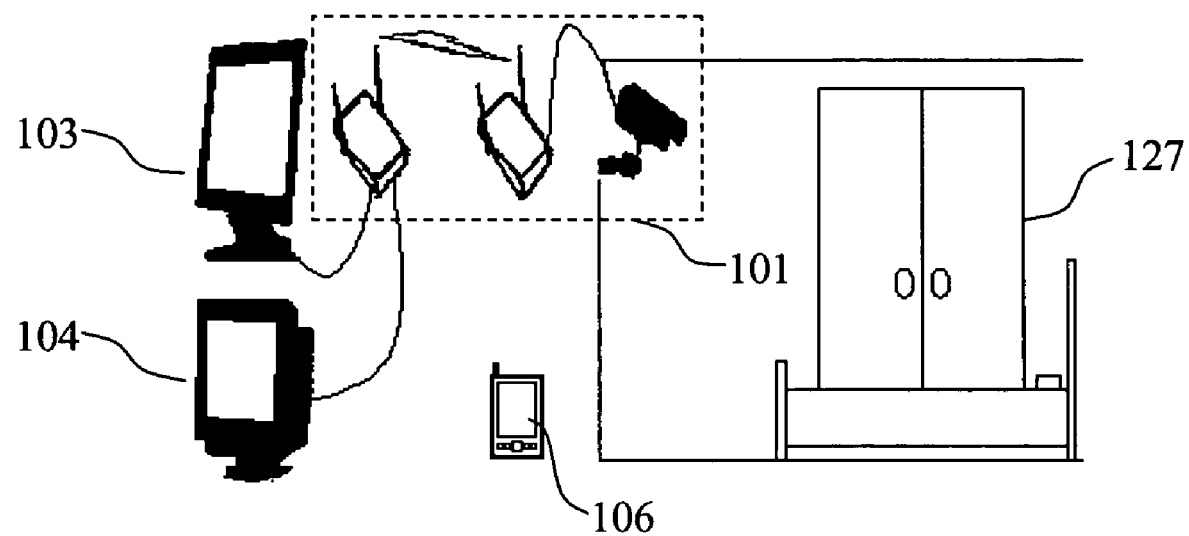
FIG. 1a is a block diagram of the video based monitoring system.
Figure 1B:
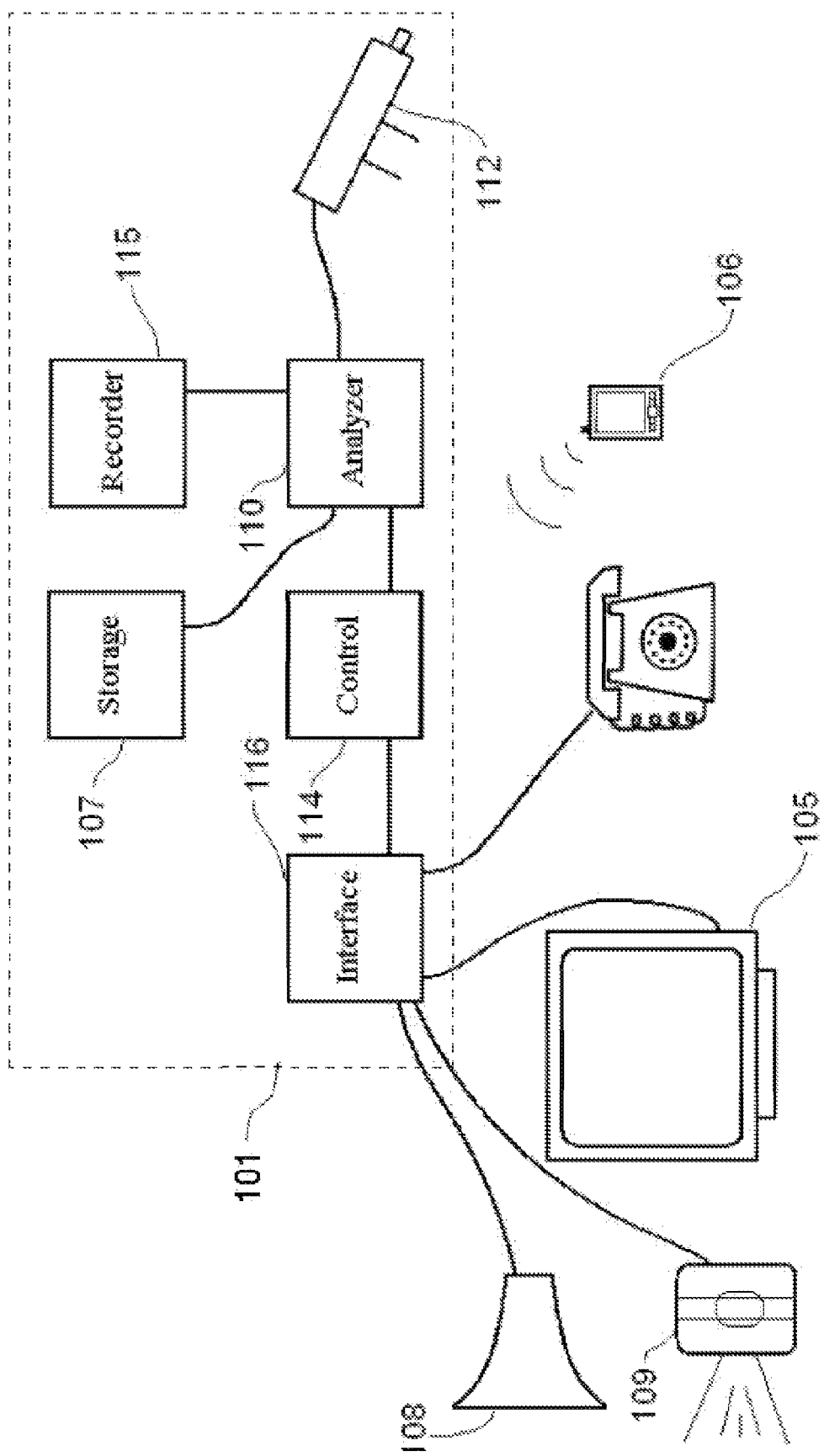
FIG. 1b is a detailed block diagram of the video based monitoring system.
Figure 2:
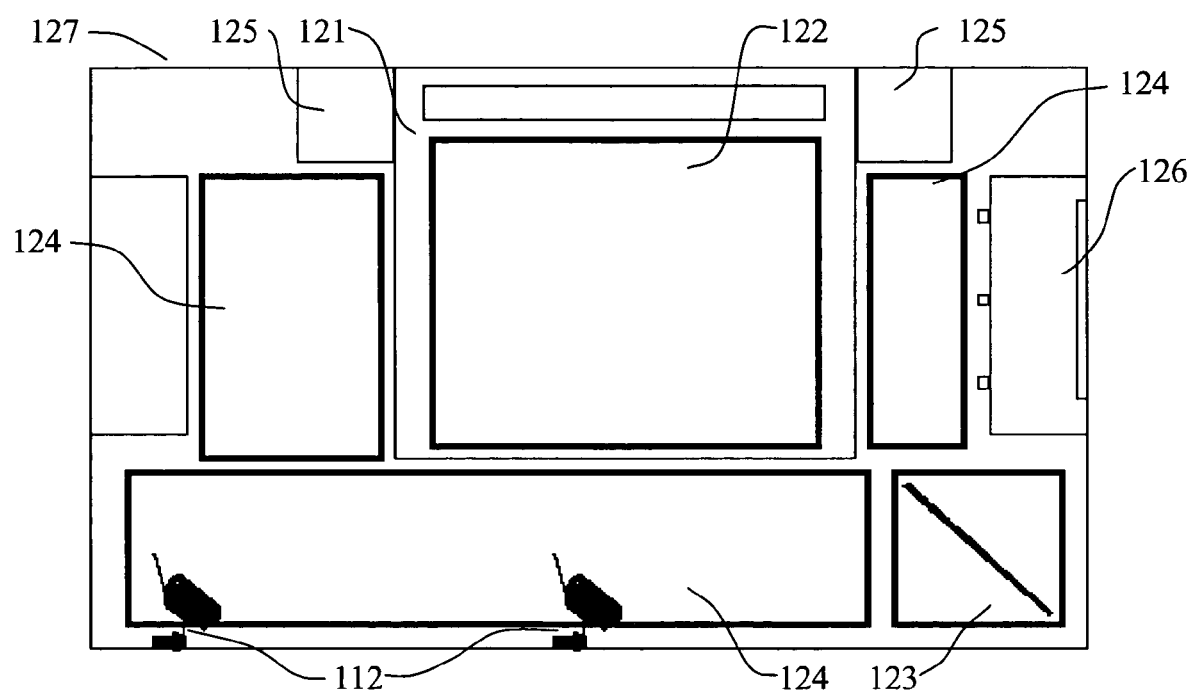
FIG. 2 is a top plan view of a room divided into zones.

A video based monitoring system is shown in FIG. 1a, where a monitoring and processing unit 101 is located to monitor the field of view of a camera located in an area, for example a hospital room. Monitoring unit 101 includes a video camera, infra-red camera or any other suitable type of sensor, which is connected by an RF, optical or wire link through a processing system described in relation to FIG. 1b, to remote display units 103 and 104. In FIG. 1b, monitoring unit 101 includes the sensor, such as video camera 112, detection and analysis unit 110 (a computer programmed with motion detection software), control unit 114 (for example a software platform implemented in a computer, such as the computer used for the analysis unit 110 or special purpose controller or the like) and network interface 116, which provides a link to the various display units 103, 104, 105 or alarms 108, 109. The detection and analysis unit 110 is configured, such as by suitable software, to define zones of interest in room 127. An exemplary set of zones is shown in FIG. 2. Outer bed zone 121 conforms to the outside edge of a bed, while interior bed zone 122 is inside the zone 121. An area near a door forms a door zone 123. A number of areas away from the door and bed form activity zones 124. Room 127 may also have furniture such as night tables 125 and dresser 126.

The use of zones 121-124 within a room allow detection unit 110 to individually quantify the level of movement in each zone. Each zone has an associated ID or type, and corresponding algorithm for classifying the detected movement. Detection unit 110 identifies motion in each zone 121-124 using a conventional digital signal processing technique. For example, some digital signal processing techniques are frame difference, block matching, mesh-based motion tracking or any other motion tracking. These methods allow the frame to be divided into pixel blocks corresponding to the zones. The pixel blocks are stored and processed within the detection and analysis unit 110. The detection unit 110 may detect the change of the texture in the image within the zone and associate the movement with a type of possible event, such as moving in zone, crossing to a neighbor zone, or more than one zone has motion.

The motion is recorded by the sensor 112 and then passed on to the analysis unit 110 that classifies this motion as a certain type of event. By defining algorithms for each zone, the user can assign a specific alarm for a specific event in each zone. For example, movement on the bed zone 122 may cause an alarm, or movement in the door zone 123 may cause an alarm. Some classifications may be motion-allowed, motion-required, motion-risky or motion-prohibited, although others may be defined according to the individual situation. According to the algorithm, each classification, or alarm, has a level of severity associated with a possible reaction. Once the motion is detected, the alarm will match the zone to a predefined event and the system will react with a predefined reaction. The reaction may be to cause the control unit 114 to provide a control signal through network interface 116 to a remote display 105 that will show the event, to cause an audible alarm 108 or a visual alarm such as flashing lights 109 to be activated, or to cause a handheld unit 106 to display a message, video, and/or emit an audible sound. The system 101 may also include a dial-up interface to call a central unit once an alarm is detected. Once the alarm is issued it can be cleared manually or the analysis unit 110 can be programmed to reset automatically after a period of time or after specific actions are taken. The alarm and event may then be stored in the storage unit 107 for post review or incident recording using any recording format such as mesh based coding, MPEG-2, MPEG-4 or any of the known recording mechanism with time stamp and event index to facilitate querying the incident later on. The storage media can be recurrent or non-recurrent and it can be a smart card, video tape or any suitable magnetic or optical recoding media.

It will be understood that different arrangements of the system will be possible. For example, the room may be monitored by a video camera 112 which transmits the video feed across a network to a remote site, where the detection, analysis, and response generation takes place. Alternatively, each room may be equipped to detect and analyze, such that only a control signal to activate a response is sent across the network. As such, network interface 112 is not limited to a specific location, but is placed wherever it is needed. In addition, each step as described may be performed, for example, by a microprocessor in a computer, where each unit comprises a step in software on the computer used to monitor the area, and the storage media is the computer's hard drive, or removable storage media.

As discussed above, the user will program algorithms corresponding to the various detecting zones within the field of view to reduce the risk to the patient according to the patients individual situation, and to count the activities. For example, with reference to FIG. 2:

1. The bed zones 121 and 122: The bed zones 121 and 122 may be programmed to watch for the risk of falling from bed. The bed is partitioned into zones 121 and 122 as shown in FIG. 2. If a motion took place in the zone 122 the system counts the motion. If the motion takes place within zone 122 but toward zone 121, the system tracks it and once the motion takes place in zone 121 an alarm will be sent to warn of a possible fall.

2. The door zone 123: The door zone 123 can be programmed to warn for motion inside the room 127 by the door. The door zone 123 will count any motion and detect the direction toward the door means leaving the room 127 and away from the door means inside the room 127. The system can send an alarm with each type of motion. The door zone 123 can be programmed to lock a patient in a room to prevent the patient from wandering. In this case, if motion were to take place the system would send an alarm. The door zone 123 can also be programmed with safety in mind, such that it will detect whether someone goes inside the room during non-visiting or non-treatment times.

3. The activity zones 124: The activity zones 124 are programmed to track the time and movement of a patient in these zones. The zones 124 will count how many periods of movement and the length of period of the movement and the time elapsed between different movement by the zone.

4. The high risk zones (not shown): The system may activate the alarm for any movement in these zones, for example, that are close to a window, a stove, or any source of danger to the patient.

Figure 3:
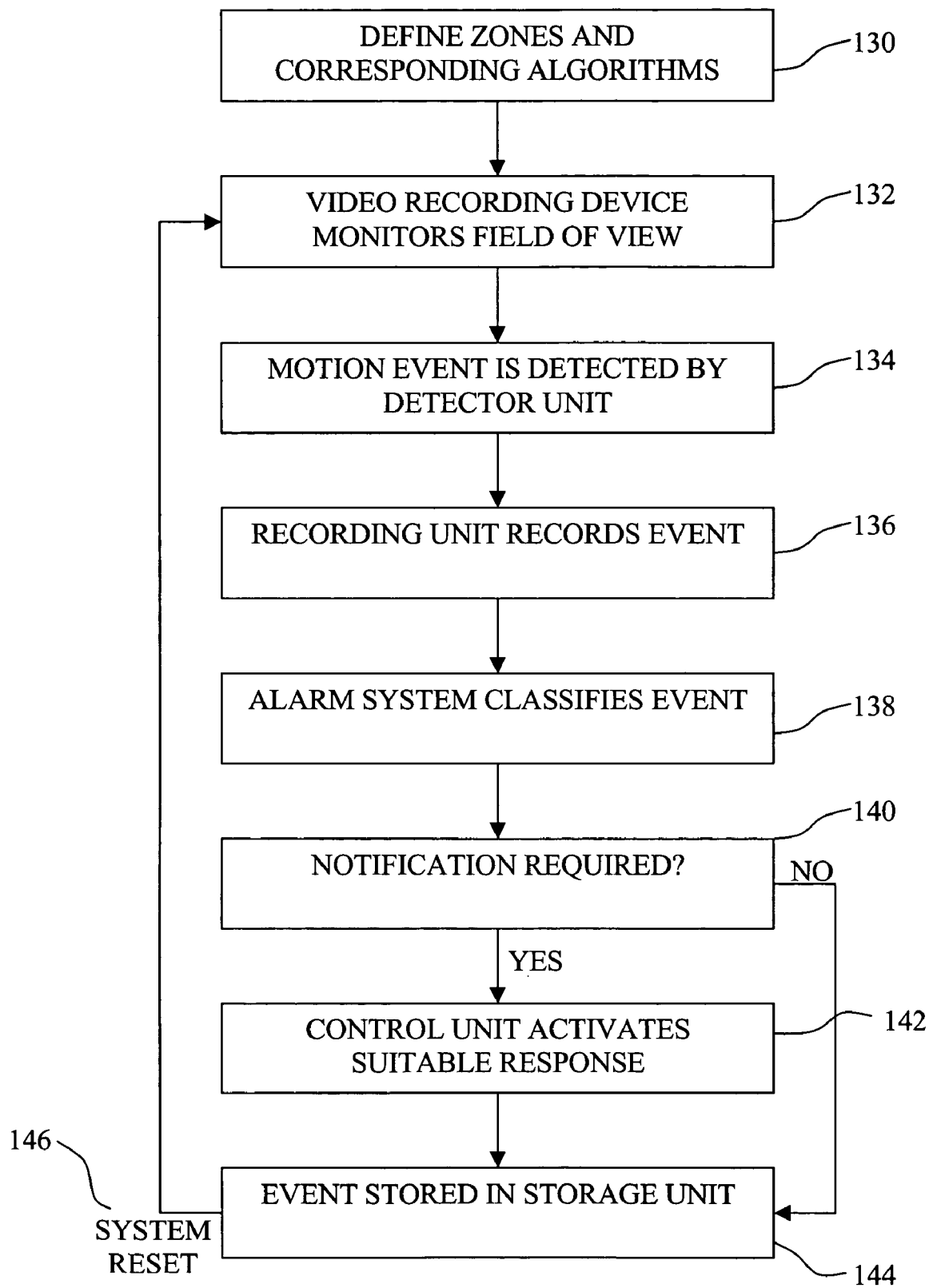
FIG. 3 illustrates method steps according to an embodiment of the invention.

The method of operation will now be discussed with reference to FIG. 3. Referring to step 130, zones are defined, for example, as shown in FIG. 2, and algorithms are assigned to each zone within analysis unit 110. In step 132, sensor 112 constantly monitors its field of view with the zones as previously defined. In step 134, detection unit 110 detects motion, and causes recording unit 115 to record the event in step 136. In step 138, the event is then analyzed by analysis unit 110 to classify the movement based upon the zone and the corresponding, pre-defined algorithm, and in step 140, a decision is made based on the classification whether notification of the event is required. If not, the event is recorded in step 144 with a time stamp and the classification, and the system is reset to step 132 to continue monitoring the room. If notification is required, control unit 114 uses the classification to activate a suitable response in step 142. Note that alternatively, the control unit 114 could make the decision of whether a response is required. Some examples of possible responses are lights and/or sounds, a dial-up notification to a remote site, a message sent to a wireless, handheld device 106, activating a display 105, or means of notifying the person responsible for monitoring the subject. The event is recorded in step 144 with a time stamp and the classification. Once a response has been triggered, the system is then reset in step 146, either manually, after a specific time, or once a specified action has been detected. Using the bed zones 121 and 122 as an example, a response may be triggered when the subject moves from zone 122 toward zone 121, but may be reset once the subject moves back to the middle of the bed zone 122. The event is stored in storage unit 107 for later review. The record of events that is kept in this method may be useful to determine, for example, whether a patient has a tendency to wander, whether they are at a higher risk of falling out of bed, or whether a patient has been performing the movements required by a doctor, so that treatment and monitoring may be adjusted accordingly. It should be noted that, while the steps have been described as assigned to specific units, the roles of each unit may be adjusted according to the situation. For example, the detection unit and analysis unit 110 may be formed of separate detection and analysis components.

In a hospital setting, more than one area may be monitored. In this situation, more than one sensor 112 may be used, which are in turn connected to individual or plural analysis units 110. If individual analysis units are used, then individual control units may be used. The determination will be made according to the software and available hardware. In any situation, it is necessary to distinguish between rooms with corresponding zones and algorithms that may be different from room to room. It is also possible to monitor hallways in this fashion, with suitable zones and algorithms being defined.

The method and apparatus as described may also be useful in a variety of situations where monitoring is required. For example in a detention facility to monitor inmates, or in a back yard where a parent wishes to monitor the safety of their young child.

In hospital application, the described system may have one or more of the following advantages: increase the nurses service efficiency with less effort, enable early release of patients and monitor them from home, provide record of movement or walking and minimize risk of fracture from falls. In home use, the described system has the advantage of allowing a hospital to connect to home for follow up, monitor an elderly person or a person with a mental disorder and help reduce retirement problems. Applications include: patient fall prevention, detection of wandering patients, remote tele-video, documentation of patient movement, assisting the nurse and medical personnel with a hand held device that can access the monitoring locations and accessibility to the monitoring system by outside authenticated links. Various benefits of using the system may include service cost reduction with higher efficiency from using fewer nursing staff and more effective in delivering service, reduce the number of broken hips or other incidents for patients, remote video for expert consultations, remote video for family—less visitors on site, and remote video for monitoring from home to the hospital which leads to earlier patient dispatch for non-critical conditions. Other characteristics include use of infrared/color video camera, intelligent surveillance for patient's rooms and hospital hallways 24/7, an alert for special events such as patient falling from bed (an event shown by the patient moving from the bed zone to outside the bed zone and then not moving), detection of general patient movement, visitor movements or intruders at non-treatment time or false interaction, and digital incident recording for verification, all without requiring major infrastructure.

Immaterial modifications may be made to the exemplary embodiments described here without departing from the invention.

What is claimed is:

1. A video-based monitoring system for monitoring an occupant of a room, the monitoring system comprising:
   a video recording device having a field of view within the room;
   a processing unit for receiving and processing video data from the video recording device, wherein the processing unit is configured to define plural zones within the field of view of the video recording device, each zone being associated with at least one algorithm, stored in the processing unit, for detecting and classifying a movement of the occupant in the respective zone; and
   the plural zones correspond at least to a bed zone and a zone within the room outside of the bed that is adjacent to the bed zone;
   the algorithm associated with the zone adjacent the bed zone being programmed to classify the movement of the occupant in the zone adjacent the bed zone based on the type of movement and movement of the occupant into the zone adjacent the bed zone from the bed zone.

2. The video-based monitoring system of claim 1 wherein the processing unit comprises an analysis unit configured to classify a movement in each zone of the plural zones based on the at least one algorithm, and a control unit configured to activate a response based on the classification.

3. The video-based monitoring system of claim 2 wherein the analysis unit is further configured to classify movement in a zone as one of no motion, motion-allowed, motion-required, motion-risky or motion-prohibited.

4. The video-based monitoring system of claim 2 wherein the processing unit further comprises a detection unit for detecting movement and a video recording unit for recording the event.

5. The video-based monitoring system of claim 1 wherein the processing unit further comprises a storage unit for storing a record of movements for future reference.

6. The video-based monitoring system of claim 5 wherein the storage unit is configured to store the movement according to time and classification.

7. The video-based monitoring system of claim 2 wherein the control unit is configured to activate a response that comprises activation of a remote monitor, activation of a wireless device, generation of a visual signal, generation of an audio signal, or activation of a dial-up connection.

8. The video-based monitoring system of claim 1 the processing unit is configured to transmit data over a wireless network.

9. The video-based monitoring system of claim 1 wherein more than one video recording device is present in the room.

10. The video-based monitoring system of claim 2 wherein the control unit is configured to receive data from plural recording devices.

11. The video-based monitoring system of claim 2 wherein the analysis unit is configured to receive data from plural recording devices.

12. The video-based monitoring system of claim 1 wherein the field of view is a hospital room.

13. The video-based monitoring system of claim 12 wherein the zones comprise one or more of a door zone, an activity zone, and a high risk zone.

14. A method of monitoring the movement of an occupant of a room, the method comprising the steps of:
   receiving video data from plural zones within the field of view of a sensor, the field of view being within a room, the plural zones including at least a bed zone and a zone outside the bed zone that is adjacent to the bed zone;
   monitoring the plural zones to detect a movement of an occupant in each zone according to respective motion detection algorithms corresponding to each zone; and
   classifying a movement of the occupant in a zone of the plural zones based on the corresponding algorithm, the algorithm associated with the zone adjacent the bed zone being programmed to classify the movement of the occupant in the zone adjacent the bed zone based on the type of movement and movement of the occupant into the zone adjacent the bed zone from the bed zone.

15. The method of claim 14 further comprising activating a response from a set of responses based on the classification.

16. The method of claim 14 further comprising classifying the movement as one of no motion, motion-allowed, motion-required, motion-risky or motion-prohibited.

17. The method of claim 16 further comprising activating a response from a set of responses according to the classification of the movement.

18. The method of claim 14 used to monitor movement in a hospital room.

19. The method of claim 18 in which the plural zones comprise more than one bed zone, each bed zone having a corresponding zone adjacent the bed zone.

20. The method of claim 14 in which the plural zones comprise one or more of a door zone, an activity zone and a high-risk zone.

21. The method of claim 20 further comprising activating a response from a set of responses based on the classification.

22. The method of claim 21 in which the movement is classified as relating to a person falling out of bed.

23. The method of claim 22 in which movement classification comprises:
   tracking movement in the bed zone towards the zone adjacent the bed zone; and
   activating at least one of the responses when the movement moves from the bed zone into the zone adjacent the bed zone.

24. The method of claim 15 in which one of the plural zones is a door zone containing a door, the method further comprising activating at least one of the responses when movement within the door zone is directed towards the door.

25. The method of claim 15 in which one of the plural zones is a door zone containing a door, the method further comprising activating at least one of the responses when movement within the door zone is directed away from door.

26. The method of claim 24 in which the at least one response comprises locking the door.

27. The method of claim 15 further comprising:
tracking movement within an activity zone of the plural zones and identifying a property of the movement within the activity zone, the property comprising at least one of a type of movement event, a frequency of movement events, a duration of movement event and a time elapsed between movement events; and
classifying the movement in the activity zone based on identifying the at least one property of the movement event.

28. The method of claim 15 further comprising:
tracking movement within a high-risk zone of the plural zones; and
activating at least one of the responses.

29. The method of claim 28 wherein the high-risk zone comprises a window, a stove, or a source of danger.

30. The method of claim 14 used to monitor movement in a detention cell.

31. A method of monitoring the movement of an occupant of a room, the method comprising the steps of:
receiving video data from an activity zone of a plurality of zones defined within a field of view of a sensor, the plurality of zones including a bed zone and a door zone, the activity zone being away from the door zone and the bed zone,
monitoring the plurality of zones to detect a movement of an occupant in each zone according to respective motion detection algorithms corresponding to each zone; classifying a movement of the occupant in a zone of the plurality of zones based on the corresponding algorithm, the algorithm associated with a zone adjacent the bed zone being programmed to classify the movement of the occupant in the zone adjacent the bed zone based on the type of movement and movement of the occupant into the zone adjacent the bed zone from the bed zone;
detecting a movement event of an occupant taking place within the activity zone;
tracking at least one property of the movement event, the at least one property comprising:
a type of movement event, a frequency of movement events, a duration of the movement event, or a time elapsed between movement events; and
activating a response based on the at least one property of the movement event.

32. A method of monitoring the movement of an occupant of a room, the method comprising the steps of:
receiving video data from a high risk zone of a plurality of zones defined within a field of view of a sensor, the high risk zone containing a danger area, the plurality of zones including a bed zone;
monitoring the plurality of zones to detect a movement of an occupant in each zone according to respective motion detection algorithms corresponding to each zone; classifying a movement of the occupant in a zone of the plurality of zones based on the corresponding algorithm, the algorithm associated with a zone adjacent the bed zone being programmed to classify the movement of the occupant in the zone adjacent the bed zone based on the type of movement and movement of the occupant into the zone adjacent the bed zone from the bed zone;
detecting a movement event of an occupant taking place within the high-risk zone;
tracking movement of an occupant in the high-risk zone, when the movement is either near the danger area or within the danger area; and
activating a response based on the tracking of the movement.

33. The method of claim 32, wherein the danger area comprises a window, stove, or source of danger.

* * * * *